(12) United States Patent
Chisholm et al.

(10) Patent No.: US 6,440,206 B1
(45) Date of Patent: Aug. 27, 2002

(54) SORBITAN ESTER TREATED PIGMENTS FOR PLASTICS APPLICATIONS

(75) Inventors: Greig Chisholm, Glasgow; Barry William Hay, Erskine, both of (GB)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 56 days.

(21) Appl. No.: 09/664,812

(22) Filed: Sep. 19, 2000

(30) Foreign Application Priority Data

Oct. 4, 1999 (GB) .............................. 9923233

(51) Int. Cl.$^7$ .................... C09B 45/14; C09B 67/36; C09B 29/32; C09B 29/33; C09B 67/42
(52) U.S. Cl. .................... 106/402; 106/217.5; 106/493; 106/498; 524/104; 524/111
(58) Field of Search ................ 106/402, 493, 106/498, 499, 217.5; 524/104, 111

(56) References Cited

U.S. PATENT DOCUMENTS

| | | | |
|---|---|---|---|
| 4,177,082 A | 12/1979 | Robertson | 106/309 |
| 5,047,517 A | 9/1991 | Deucker | 534/784 |
| 5,151,505 A | 9/1992 | Hari et al. | 534/728 |

FOREIGN PATENT DOCUMENTS

| | | |
|---|---|---|
| DE | 23 40 767 | 2/1975 |
| DE | 42 29 442 | 3/1994 |
| EP | 0 126 405 | 11/1984 |
| GB | 2 008 601 | 6/1979 |
| GB | 2 009 204 | 6/1979 |
| WO | 98/51160 | 11/1998 |

OTHER PUBLICATIONS

Chemicals Abstracts 83:207670 CA of JP 50101427 (Aug. 1975).
Chemicals Abstracts 129:162301 CA of JP 10204243 (Aug. 1998).
Derwent Abst. #84–295266/48 of DE 3 318 073 (which=EP 126 405) (May 1983).
Derwent Abst. #94–084239/11 of DE 42 29 42 (Sep. 1992).
Chemical Absts. vol. 83, pp. 116 # 195210n of De 2,340,767 (Feb. 1975).
Patent abstracts of Japan # 04063878 of JP 02174155 (Feb. 1992).
Patent abstracts of Japan # 04161467 of JP 02286241 (Jun. 1992).
Patent abstracts of Japan #04356568 of JP 03130856 (Dec. 1992).

*Primary Examiner*—Anthony J. Green
(74) *Attorney, Agent, or Firm*—David R. Crichton

(57) ABSTRACT

The present invention is directed to a composition comprising a sorbitan ester of the formula I

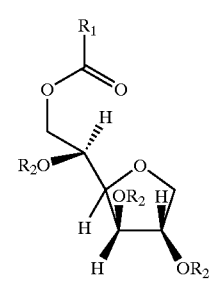

and a monoazo pigment. The present invention further encompasses a process for its preparation and its use as well as the use of the sorbitan ester I as additive to improve color strength and dispersion properties.

10 Claims, No Drawings

SORBITAN ESTER TREATED PIGMENTS FOR PLASTICS APPLICATIONS

The present invention relates to a composition comprising (a) from 1 to 20, preferably from 1 to 10% by weight of a sorbitan ester of the formula I

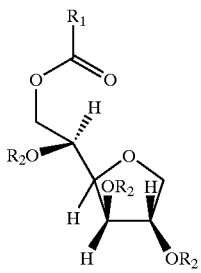

wherein $R_1$ and $R_2$, independently from each other, stand for $C_1$–$C_{20}$alkyl or $C_2$–$C_{20}$alkenyl, and (b) from 99 to 80, preferably from 99 to 90% by weight of a metal or ammonium laked monoazo pigment of formula 11

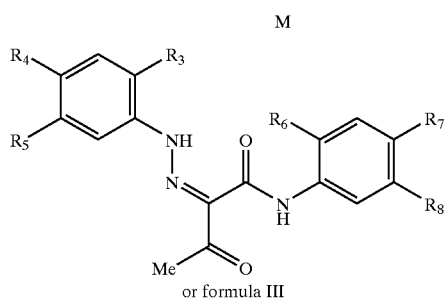

or formula III

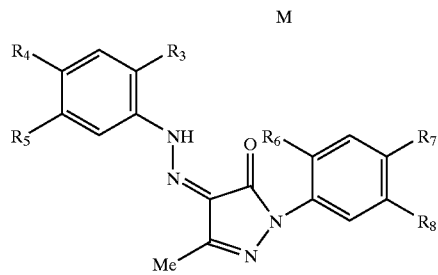

wherein
$R_3$, $R_4$, $R_5$, $R_6$, $R_7$ and $R_8$ independently from each other stand for hydrogen, $C_1$–$C_{20}$alkyl $C_1$–$C_{20}$alkoxy, $C_2$–$C_{20}$alkenyl, $C_1$–$C_{20}$alkylthiol, $C_1$–$C_{20}$alkoxycarbonyl, hydroxy$C_1$–$C_4$alkoxy, phenyl, benzyl, phenylthio, fluoro, chloro, bromo, iodo, —CN, —NO$_2$, —CF$_3$, —COR$_9$, —COOR$_9$, —CONR$_9$R$_{10}$, —SO$_2$R$_9$, —SO$_2$NR$_9$R$_{10}$, —NR$_9$NR$_{10}$ in which each $R_9$ and $R_{10}$ are each independently from each other hydrogen, —OH, $C_{1-4}$-alkyl or phenyl, where at least one of $R_3$, $R_4$, $R_5$, $R_6$, $R_7$ and $R_8$ is either —COOH or —SO$_3$H, and M may be NH$_4^+$, or a cation of an alkali metal, an alkaline earth metal, such as Na, K, Mg, Ca, Sr, Ba, or a cation of a transition metal such as Mn, Co, Ni, Cu, Fe or Al, as well as a process for its preparation and its use as well as the use of the sorbitan ester I as an additive to improve color strength and dispersion properties.

WO 9851160 describes a pigment or dyestuff composition comprising 2 to 10% by weight of a pigment or dyestuff, 3 to 30% by weight of a polyoxyethylene sorbitan fatty acid ester, 1 to 10% by weight of another sorbitan fatty acid ester and dispersing agents.

JP-A2 10204243 describes vinylidene chloride-based polymer compositions with improved dispersibility for coloration of polymers comprising the polymer, 30% by weight Pigment Red 208, 2% by weight sorbitan trioleate and other additives.

U.S. Pat. No. 4,177,082 describes nondusting, easily dispersible pigment or dye granules, wherein a pigment is treated with a mixture of hydroxyethylcellulose, an amine, sorbitan tristearate and dicyclohexyl phthalate under elevated temperature, then pH adjusting and finally mixing with a polymer such as polyvinylchloride ("PVC") or polyethylene ("PE").

JP-A2 50101427 describes compositions comprising a pigment, PVC, diphenol derivatives and polyethylene glycol sorbitan monolaurate. According to this document the addition of bisphenol A is essential for a good dispersibility.

However, the dispersibility and color strength of the abovementioned compositions is not good enough for todays demands. Further, in all cases the pigments and the additives, inter alia sorbitan fatty acid esters, are mixed together at the same time. In addition, compositions consisting of just a pigment and sorbitan fatty acid esters are not known, rather, always additional additives have to be used, too.

Hence, the object of this invention was to provide compositions consisting of a metal or ammonium laked monoazo pigments with improved color strength and dispersion properties. Especially, an object was to improve the color strength and dispersion properties of Pigment Yellow 191:1 by the addition of an appropriate additive. In addition, the inventive composition should be used in food contact applications.

Accordingly, the above defined composition was found.

Metal or ammonium laked monoazo pigments such as Pigment Yellow 61, Pigment Yellow 62:1, Pigment Yellow 100, Pigment Yellow 133, Pigment Yellow 168, Pigment Yellow 169, Pigment Yellow 183 (e.g. Paliotol®Yellow K-2270 from BASF), Pigment Yellow 190 (e.g. PV Fast yellow HGR from Hoechst), and Pigment Yellow 191:1 are well known to the person skilled in the art, e.g. from Herbst/Hunger, "Industrielle Organische Pigmente", 2nd edition, VCH 1995, p. 240–243.

A preferred embodiment of the present invention relates to a composition consisting essentially of (a) from 1 to 10% by weight of sorbitan ester I, preferably wherein $R_1$=$R_2$=$C_8$–$C_{20}$alkyl or $C_8$–C20alkenyl, and (b) from 99 to 90% by weight of compound II or compound III, preferably wherein $R_3$, $R_4$, $R_5$, $R_6$, $R_7$ and $R_8$ independently from each other stand for hydrogen, methyl, methoxy, fluoro, chloro, bromo, iodo, —NO$_2$, —CF$_3$, —COOR$_9$, —SO$_2$R$_9$, in which $R_9$ preferably stands for hydrogen or —OH, and more preferred, wherein at least one of $R_3$, $R_4$, $R_5$, $R_6$, $R_7$ and $R_8$ independently from each other, stand for —COOH or —SO$_3$H, and wherein M stands for ammonium, or a cation of Ca, Sr or Al.

Another preferred embodiment of the instant invention relates to a composition consisting essentially of (a) from 1 to 10% by weight of a sorbitan ester I, wherein $R_1$ stands for n-undecyl, and (b) from 90 to 99% by weight of a laked monoazo derivative of formula IIIa

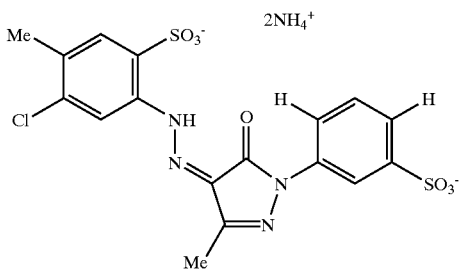

A particularly preferred embodiment relates to a composition consisting of
(a) 95% by weight of monoazo derivative IIIa and
(b) 5% by weight of sorbitan monolaurate.

A further particularly preferred embodiment relates to a composition consisting of
(a) 95% by weight of

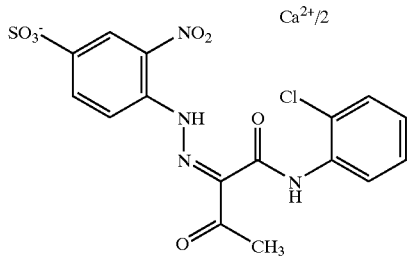

(b) 5% by weight of sorbitan monostearate.

$C_1$–$C_{20}$alkyl stands for methyl, ethyl, n-, i-propyl, n-, i-, sec.-, tert.-butyl, n-pentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-eicosyl, preferably $C_8$–$C_{20}$alkyl such as n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-eicosyl;

$C_1$–$C_4$alkyl stands for methyl, ethyl, n-, i-propyl, n-, i-, sec.-, tert.-butyl;

$C_1$–$C_{20}$alkoxy stands for methoxy, ethoxy, n-, i-propoxy, n-, i-, sec.-, tert.-butoxy, n-pentoxy, n-hexoxy, n-heptoxy, n-octoxy, n-nonoxy, n-decoxy, n-undecoxy, n-dodecoxy, n-tridecoxy, n-tetradecoxy, n-pentadecoxy, n-hexadecoxy, n-heptadecoxy, n-octadecoxy, n-nonadecoxy, n-eicosoxy;

$C_2$–$C_{20}$alkenyl stands for ethenyl, n-, i-propenyl, n-, i-, sec.-, tert.-butenyl, n-pentenyl, n-hexenyl, n-heptenyl, n-octenyl, n-nonenyl, n-decenyl, n-undecenyl, n-dodecenyl, n-tridecenyl, n-tetradecenyl, n-pentadecenyl, n-hexadecenyl, n-heptadecenyl, n-octadecenyl, n-nonadecenyl, n-eicosenyl;

$C_1$–$C_{20}$alkylthio stands for methylthio, ethylthio, n-, i-propylthio, n-, i-, sec.-, tert.-butylthio, n-pentylthio, n-hexylthio, n-heptylthio, n-octylthio, n-nonylthio, n-decylthio, n-undecylthio, n-dodecylthio, n-tridecylthio, n-tetradecylthio, n-pentadecylthio, n-hexadecylthio, n-heptadecylthio, n-octadecylthio, n-nonadecylthio, n-eicosylthio;

$C_1$–$C_{20}$alkoxycarbonyl stands for methoxycarbonyl, ethoxycarbonyl, n-, i-propoxycarbonyl, n-, i-, sec.-, tert.-butoxycarbonyl, n-pentoxycarbonyl, n-hexoxycarbonyl, n-heptoxycarbonyl, n-octoxycarbonyl, n-nonoxycarbonyl, n-decoxycarbonyl, n-undecoxycarbonyl, n-dodecoxycarbonyl, n-tridecoxycarbonyl, n-tetradecoxycarbonyl, n-pentadecoxycarbonyl, n-hexadecoxycarbonyl, n-heptadecoxycarbonyl, n-octadecoxycarbonyl, n-nonadecoxycarbonyl, n-eicosoxycarbonyl;

hydroxy$C_1$–$C_4$alkoxy hydroxymethoxy, hydroxyethoxy, hydroxy-n-, -i-propoxy, hydroxy-n-, -i-, -sec.-, -tert.-butoxy;

M may be $NH_4^+$, or a cation of an alkali metal, an alkaline earth metal, such as Na, K, Mg, Ca, Sr, Ba, or a cation of a transition metal such as Mn, Co, Ni, Cu, Fe or from Al.

Another embodiment of the present invention is directed to a process for the preparation of the inventive compositions, wherein
(a) a mixture of a pigment of formula II or III, sorbitan ester I and water is heated to a temperature in the range of 70 to 100° C., preferably to reflux, for 1 to 60 minutes, then
(b) cooling the obtained mixture to a temperature in the range of from 30 to 70° C., then
(c) separation of the solid parts from the liquid parts,
(d) drying the obtained solid parts at a temperature in the range of from 50 to 90° C., and
(e) optionally sieving the thus dried pigment composition to the desired particle size.

Another preferred embodiment relates to a process for the preparation of the inventive composition characterized in
(a) reacting an amino compound of formula IV

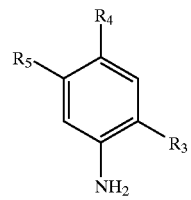

with sodium nitrite,
(b) reacting the thus obtained diazo component with either

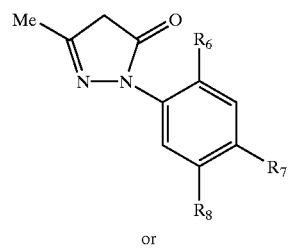

or

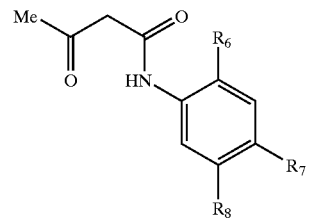

(c) adding an effective amount of a metal salt or ammonium salt, MX, wherein X stands for an anion, to the reaction mixture obtained in (b) or during one of the reaction steps (a) and/or (b),
(d) adding a sorbitan ester I to the reaction mixture obtained in (b) or in one of the reaction steps (a) and/or (b).

The general synthesis is known to the skilled artisan, e.g. from U.S. Pat. No. 5,151,505.

Another embodiment of the present invention is related to a method of coloring high molecular weight organic materials (having a molecular weight usually in the range of from $10^3$ to $10^7$ g/mol) by incorporating the inventive compositions I by known methods in the art. As high molecular weight organic materials the following can be used such as biopolymers, and plastic materials, including fibres.

Illustrative examples of suitable organic materials of high molecular weight which can be colored with the inventive compositions of this invention are vinyl polymers, for example poly-styrene, poly-α-methylstyrene, poly-p-methylstyrene, poly-p-hydroxystyrene, poly-p-hydroxyphenylstyrene, polymethyl methacrylate and polyacrylamide as well as the corresponding methacrylic compounds, polymethylmaleate, polyacrylonitrile, polymethacrylonitrile, polyvinyl chloride, polyvinyl fluoride, polyvinylidene chloride, polyvinylidene fluoride, polyvinyl acetate, polymethyl vinyl ether and polybutyl vinyl ether; polymers which are derived from maleinimide and/or maleic anhydride, such as copolymers of maleic anhydride with styrene; polyvinyl pyrrolidone; ABS; ASA; polyamides; polyimides; polyamidimides; polysulfones; polyether sulfones; polyphenylene oxides; polyurethanes; polyureas; polycarbonates; polyarylenes; polyarylene sulfides; polyepoxides; polyolefins such as polyethylene and polypropylene; polyalkadienes; biopolymers and the derivatives thereof e.g. cellulose, cellulose ethers and esters such as ethylcellulose, nitrocellulose, cellulose acetate and cellulose butyrate, starch, chitin, chitosan, gelatin, zein; natural resins; synthetic resins such as alkyd resins, acrylic resins, phenolic resins, epoxide resins, aminoformaldehyde resins such as urea/formaldehyde resins and melamine/formaldehyde resin; vulcanized rubber; casein; silicone and silicone resins; rubber, chlorinated rubber; and also polymers which are used, for example, as binders in paint systems, such as novolaks which are derived from $C_1$–$C_6$-aldehydes such as formaldehyde and acetaldehyde and a binuclear or mononuclear, preferably mononuclear, phenol which, if desired, is substituted by one or two $C_1$–$C_9$alkyl groups, one or two halogen atoms or one phenyl ring, such as o-, m- or p-cresol, xylene, p-tert.-butylphenol, o-, m- or p-nonylphenol, p-chlorophenol or p-phenylphenol, or a compound having more than one phenolic group such as resorcinol, bis(4-hydroxyphenyl)methane or 2,2-bis(4-hydroxyphenyl)propane; as well as suitable mixtures of said materials.

Particularly preferred high molecular weight organic materials, in particular for the preparation of a paint system, a printing ink or ink, are, for example, cellulose ethers and esters, e.g. ethylcellulose, nitrocellulose, cellulose acetate and cellulose butyrate, natural resins or synthetic resins (polymerization or condensation resins) such as aminoplasts, in particular urea/formaldehyde and melamine/formaldehyde resins, alkyd resins, phenolic plastics, polycarbonates, polyolefins, polystyrene, polyvinyl chloride, polyamides, polyurethanes, poly-ester, ABS, ASA, polyphenylene oxides, vulcanized rubber, casein, silicone and silicone resins as well as their possible mixtures with one another.

In a particularly preferred embodiment of this invention, the inventive compositions are used for the mass coloration of polyvinyl chloride, polyamides and, especially, polyolefins such as polyethylene and polypropylene.

According to observations made to date, the inventive compositions can be added in any desired amount to the material to be colored, depending on the end use requirements. In the case of high molecular weight organic materials, for example, the compositions prepared according to this invention can be used in an amount in the range from 0.01 to 40, preferably from 0.01 to 5% by weight, based on the total weight of the colored high molecular weight organic material.

Hence, another embodiment of the present invention relates to a composition comprising
(a) 0.01 to 50, preferably 0.01 to 5, particularly preferred 0.01 to 2% by weight, based on the total weight of the colored high molecular organic material, of a composition according to the present invention, and
(b) 99.99 to 50, preferably 99.99 to 95, particularly preferred 99.99 to 98% by weight, based on the total weight of the colored high molecular organic material, of a high molecular organic material, and
(c) if desired, customary additives such as rheology improvers, dispersants, fillers, paint auxiliaries, siccatives, plasticizers, UV-stabilizers, and/or additional pigments or corresponding precursors in effective amounts, such as e.g. from 0 to 50% by weight, based on the total weight of (a) and (b).

To produce non-brittle mouldings or to diminish their brittleness, so-called plasticizers can be added to the high molecular weight organic materials prior to moulding. Plasticizers may be, for example, esters of phosphoric acid, phthalic acid and sebacic acid. Said plasticizers may be added before, during or after pigmenting the high molecular weight organic materials with the inventive compositions.

To obtain different shades, the inventive compositions may advantageously be used in admixture with fillers, transparent and opaque white, colored and/or black pigments as well as customary luster pigments in the desired amount.

A further embodiment of the present invention relates to a method of using the inventive compositions for the preparation of dispersions and the corresponding dispersions comprising the inventive compositions.

In addition to, or in place of the preferred polymeric dispersants, surfactants may be used as dispersants. These may be anionic, nonionic, or amphoteric surfactants. A detailed list of non-polymeric as well as some polymeric dispersants is disclosed in the section on dispersants of Manufacturing Confection Publishing Co., (1990) p. 110–129, McCutcheon's Functional Materials, North America Edition.

For the pigmentation of high molecular weight organic material, the inventive compositions, optionally in the form of masterbatches, usually are mixed with the high molecular weight organic materials using roll mills, mixing apparatus or grinding apparatus. Generally, the pigmented material is subsequently brought into the desired final form by conventional processes, such as calandering, compression molding, extrusion, spreading, casting or injection molding. In order to prepare non-rigid moldings or to reduce their brittleness it is often desired to incorporate so-called plasticizers into the high molecular weight organic materials prior to forming. Examples of compounds which can be used as such plasticizers are esters of phosphoric acid, phthalic acid or sebacic acid. The plasticizers can be added before or after the incorporation of the inventive compositions into the polymers. It is also possible, in order to achieve different hues, to add fillers or other coloring constituents such as white, color or black pigments in desired amounts to the high molecular weight organic materials in addition to the inventive compositions.

A further embodiment of the present invention relates to the use of the sorbitan ester I as an additive to improve color strength and dispersibility of metal or ammonium laked monoazo pigments, preferably of the pigments II or III.

Plastics and fibres pigmented with the inventive compositions exhibit superior color strength and the pigments dispersed therein exhibit superior dispersibility.

EXAMPLES

Example 1

1-amino-3-chloro-4-methylbenzenesulphonic acid (46.5 g) and ammonia (as aqueous solution 33%, 14.5 g) are added to water (500 ml) at 50° C. The mixture is stirred for 30 minutes. Activated carbon (0.3 g, Actibon C manufactured by Quimir), amorphous silica (0.6 g, Celite J2 from Johns-Manville) are added and stirred for a further 15 minutes. The mixture is then filtered, the filter residue washed with water (60 ml) and the combined filtrate thus obtained is cooled to 20° C. by the addition of ice. Concentrated aqueous HCl (41.3 g) is added. The slurry thus obtained is diazotised by addition of sodium nitrite (14.6 g).

In a separate vessel 1-(3'-sulphophenyl)4-methylpyrazol-2-one (58.6 g) is added to water (630 ml) and stirred to form a suspension. The above obtained diazonium solution is then added over 10 minutes and the pH adjusted to 6.8 by the addition of concentrated aqueous ammonia solution. The slurry is stirred for 30 minutes. Thereafter, sorbitan monolaurate (2.5 g) in water (50 ml) is added and the mixture heated to reflux for five minutes. Then, the slurry is cooled to 70° C. by the addition of ice, filtered and the obtained residue dried at 70° C. The dried product thus obtained is sieved through a 250 μm sieve to give a powdered pigment composition.

Example 2

Example 1 is repeated except that a mixture of sorbitan monolaurate (3.0 g) and sorbitan monopalmitate (2.0 g) is used.

Example 3a

The composition of example 1 is milled for eight minutes into low density polyethylene (from Micropol; with a melt flow index of 7; ratio pigment/LDPE=0.3% by weight).

Example 3b

Example 3a is repeated except that the product of example 1 and $TiO_2$ are milled into polyvinyl chloride (Evipol from EVC; ratio pigment/PVC=0.1% by weight, $TiO_2$/pigment of ex.1=10:1).

The colour strength of the thus pigmented high molecular weight organic material is assessed using a spectrophotometer (from Datacolor). A dispersion property (dispersibility) is assessed visually after viewing the pigmented high molecular weight organic material through a microscope. The following scale is adopted for visual assessments: 1=very slight increase, 2=slight increase, 3=slight-moderate increase, 4=moderate increase, 5=moderate-severe increase, wherein a decrease in the estimated number of visible aggregates per unit area at a ×25 magnification is taken as an increase in the dispersibility. The results are summarized in the Table below.

Example 4

Example 3 is repeated except that the composition of example 2 is used.

Comparative Example 1

Example 3 is repeated except that Pigment Yellow 191:1 (CROMOPHTHAL YELLOW HRP from Ciba Specialty Chemicals) is used.

TABLE

| Sample | Colour Strength in LDPE | Dispersibility in PVC |
| --- | --- | --- |
| ex. 3 | 116 | 3 |
| ex. 4 | 118 | 3 |
| comp. ex. 1 | 100 | 0 |

Example 5

The ammonium salt of 4-amino-3-nitrobenzenesulphonic acid (31.6 g) is dissolved in water (125 ml) at 60° C. Ethylenediaminetetraacetic acid (0.38 g) in water (15 ml) is added. Concentrated HCl is added (27 ml, conc. 36%) and the temperature of the mixture is lowered to 0° C. by addition of ice. The slurry thus obtained is diazotised to a fine end point by addition of sodium nitrite (7.6 g) in water (30 ml). The temperature is maintained at 5 to 7° C. during diazotisation and is lowered to 0° C. immediately prior to coupling.

In a separate vessel acetoacet-o-chloroanilide (23.4 g), 47% by weight of an aqueous sodium hydroxide solution (9 ml) and water (170 ml) are stirred to give a solution. Sodium acetate (4.7 g) and calcium carbonate (6.8 g) are added. The mixture is cooled to 5° C. by addition of ice. A solution of cooled (5° C.) glacial acetic acid (9.2 g) in water (170 ml) is added until the pH reaches 7.0. The slurry thus obtained is stirred for one hour.

The diazonium solution is added to the anilide slurry over one hour at pH 4.6 tp 4.8. pH adjustments are made with dilute NaOH solution. The yellow slurry obtained is stirred for a further one hour. Sorbitan monolaurate (0.5 g) is added and the slurry is heated to 85° C. by steam injection. The slurry is cooled to 70° C. by the addition of ice, filtered and dried at 70° C. The dried pigment thus obtained is sieved through a 250 μm sieve to give a powdered pigment composition.

Example 6

Example 6 is identical to example 5 except that sorbitan monostearate (2.5 g) is added.

Example 7

Example 7 is identical to example 5 except that sorbitan trioleate (1.5 g) is added.

Example 8

Example 8 is identical to example 5 except that sorbitan trioleate (2.5 g) is added.

Example 9–12

The pigment preparations of examples 5 to 8 are dispersed into polyvinyl chloride. In addition, IRGALITE®Yellow WGP which had been prepared in the laboratory in exactly the same manner as examples 5 to 8 excluding the addition of the sorbitan surfactant is dispersed into the same plastic for comparison. Dispersion is assessed visually after viewing the plastic through a microscope. The following scale is adopted for visual assessments: 1=very slight increase, 2=slight increase, 3=slight-moderate increase, 4=moderate increase, 5=moderate-severe increase. All assessments are made in comparison with the untreated standard.

| Sample | Dispersion in PVC |
|---|---|
| Control | 0 |
| Example 5 | +3 |
| Example 6 | +3 |
| Example 7 | +3 |
| Example 8 | +3 |

What is claimed is:

1. Composition consisting essentially of
   (a) from 1 to 20% by weight of a sorbitan ester of the formula I

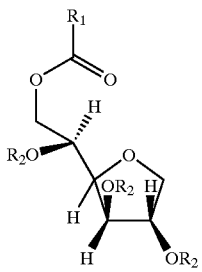

I wherein
   $R_1$ is —$C_1$–$C_{20}$alkyl or —$C_2$–$C_{20}$alkenyl, and
   each $R_2$ is independently of one another hydrogen or —$COC_{17}$alkenyl, and
   (b) from 99 to 80% by weight of a metal or ammonium laked monoazo pigment of formula II

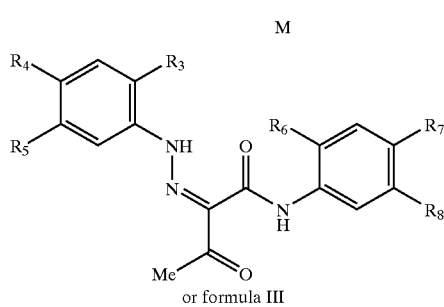

II or formula III

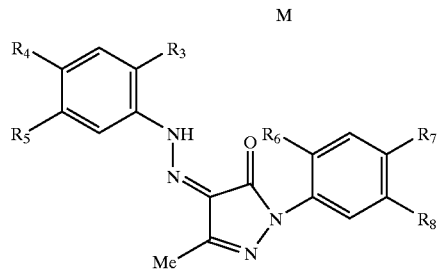

III wherein
   $R_3$, $R_4$, $R_5$, $R_6$, $R_7$ and $R_8$ independently from each other stand for hydrogen, $C_1$–$C_{20}$alkyl, $C_1$–$C_{20}$alkoxy, $C_2$–$C_{20}$alkenyl, $C_1$–$C_{20}$alkylthiol, $C_1$–$C_{20}$alkoxycarbonyl, hydroxy$C_1$–$C_4$alkoxy, phenyl, benzyl, phenylthio, fluoro, chloro, bromo, iodo, —CN, —$NO_2$, —$CF_3$, —$COR_9$, —$COOR_9$, —$CONR_9R_{10}$, —$SO_2R_9$, —$SO_2NR_9R_{10}$, —$NR_9NR_{10}$ in which each $R_9$ and $R_{10}$ are each independently from each other hydrogen, —OH, $C_{1-4}$-alkyl or phenyl, where at least one of $R_3$, $R_4$, $R_5$, $R_6$, $R_7$ and $R_8$ is either —COOH or —$SO_3H$, and M is $NH_4^+$, or a cation of an alkali metal, an alkaline earth metal or a transition metal.

2. Process for the preparation of the composition according to claim 1, comprising
   (a) heating a mixture of a pigment of formula II or III, sorbitan ester I and water to a temperature in the range of 70 to 100° C., for 1 to 60 minutes, then
   (b) cooling the obtained mixture to a temperature in the range of from 30 to 70° C., then
   (c) separating solid parts precipitated during cooling step (b) from the liquid, and
   (d) drying the obtained solid parts at a temperature in the range of from 50 to 90° C.

3. A process for pigmenting high molecular weight organic materials comprising incorporating the composition according to claim 1 into said high molecular weight organic material.

4. High molecular weight organic materials comprising the composition according to claim 1.

5. A composition obtained by following the process according to claim 2.

6. A composition according to claim 1 consisting essentially of
   (a) from 1 to 10% by weight of a sorbitan ester I, wherein $R_1$ stands for n-undecyl and $R_2$ is hydrogen, and
   (b) from 90 to 99% by weight of a laked monoazo derivative of formula IIIa

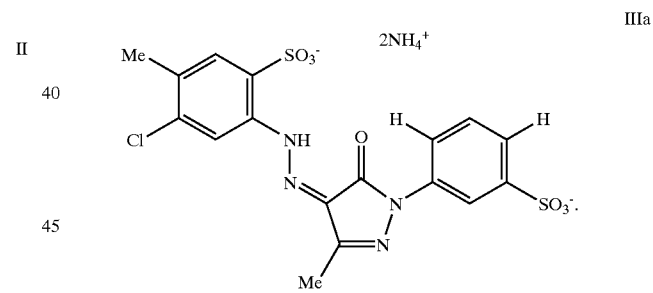

IIIa

7. Composition consisting of (a) 95% by weight of

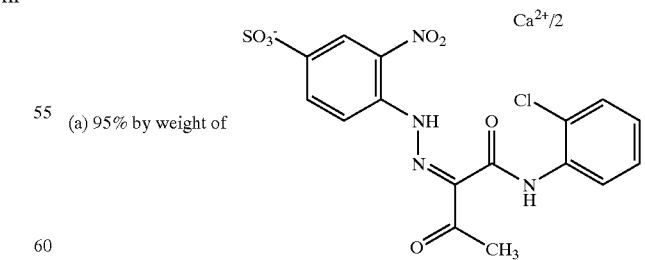

and
(b) 5% by weight of sorbitan monostearate.

8. A composition according to claim 1 wherein the composition has 1 to 10% by weight of component (a) and from 99 to 90% by weight of component (b).

9. A composition according to claim 1 wherein M is a cation of an alkaline earth metal selected from Na, K, Mg, Ca, Sr, Ba, or a cation of a transition metal selected from Mn, Co, Ni, Cu, Fe or Al.

10. Process according to claim 2, wherein the mixture of a pigment of formula II or III, sorbitan ester I and water are heated to reflux.

* * * * *